(12) United States Patent
Guillory et al.

(10) Patent No.: US 10,574,648 B2
(45) Date of Patent: Feb. 25, 2020

(54) METHODS AND SYSTEMS FOR USER AUTHENTICATION

(71) Applicant: Dashlane, Inc., New York, NY (US)

(72) Inventors: Thomas Guillory, Courbevoie (FR); Guillaume Maron, Paris (FR); Frédéric Rivain, Paris (FR); Alexis Fogel, Levallois-Perret (FR)

(73) Assignee: Dashlane SAS, Paris (FR)

( * ) Notice: Subject to any disclaimer, the term of this patent is extended or adjusted under 35 U.S.C. 154(b) by 226 days.

(21) Appl. No.: 15/622,821

(22) Filed: Jun. 14, 2017

(65) Prior Publication Data

US 2018/0183777 A1    Jun. 28, 2018

Related U.S. Application Data

(60) Provisional application No. 62/437,991, filed on Dec. 22, 2016.

(51) Int. Cl.
*H04L 29/06* (2006.01)
*H04L 9/32* (2006.01)

(52) U.S. Cl.
CPC .......... *H04L 63/083* (2013.01); *H04L 9/3271* (2013.01); *H04L 63/0435* (2013.01); *H04L 63/0442* (2013.01); *H04L 63/061* (2013.01)

(58) Field of Classification Search
CPC . H04L 63/083; H04L 9/3271; H04L 63/0435; H04L 63/061; H04L 63/0442
See application file for complete search history.

(56) References Cited

U.S. PATENT DOCUMENTS

| | | |
|---|---|---|
| 5,434,918 A | 7/1995 | Kung et al. |
| 5,495,533 A | 2/1996 | Linehan et al. |
| 5,560,008 A | 9/1996 | Johnson et al. |
| 5,684,951 A | 11/1997 | Goldman et al. |
| 5,946,380 A | 8/1999 | Cohen |
| 6,044,155 A | 3/2000 | Thomlinson et al. |
| 7,472,423 B2 | 12/2008 | DeCenzo et al. |
| 8,006,280 B1 | 8/2011 | Hildebrand et al. |
| 8,059,818 B2 | 11/2011 | Asokan et al. |
| 8,571,937 B2 | 10/2013 | Rose |
| 8,601,600 B1 | 12/2013 | Shankar |

(Continued)

OTHER PUBLICATIONS

"LastPass Gets the Green Light from Security Now!'s Steve Gibson", LastPass Blog, (http://blog.lastpass.com/2010/07/lastpass-gets-green-light-from-security.html), Jul. 21, 2010, 11 pages.

(Continued)

*Primary Examiner* — Mahfuzur Rahman
(74) *Attorney, Agent, or Firm* — Merchant & Gould P.C.

(57) ABSTRACT

Methods and systems for passwordless authenticating of a user are provided. A first request to access a first content is received from a first user of a first device. A first challenge is sent to the first device in response to the first request. The first challenge is resolved using a first private key associated with the first user for the first content. A first response, including a resolved challenge, is received from the first device. It is determined whether the first response is an acceptable response to the first challenge. Access to the first content is granted to the first user in response determining that the first response is an acceptable response.

18 Claims, 5 Drawing Sheets

(56) References Cited

U.S. PATENT DOCUMENTS

| | | | |
|---|---|---|---|
| 8,644,969 B2* | 2/2014 | Ben-Yaacov | G06Q 20/10 381/56 |
| 8,990,888 B2 | 3/2015 | Busser | |
| 9,330,245 B2 | 5/2016 | Maron | |
| 9,355,391 B2 | 5/2016 | von Behren | |
| 9,691,055 B2 | 6/2017 | von Behren | |
| 9,779,007 B1 | 10/2017 | Patzer | |
| 9,824,408 B2 | 11/2017 | Isaacson | |
| 2002/0122553 A1 | 9/2002 | Kao | |
| 2003/0177401 A1 | 9/2003 | Arnold | |
| 2004/0123159 A1 | 6/2004 | Kerstens et al. | |
| 2004/0187018 A1 | 9/2004 | Owen et al. | |
| 2005/0027713 A1 | 2/2005 | Cameron | |
| 2005/0222963 A1 | 10/2005 | Johnson | |
| 2005/0228994 A1 | 10/2005 | Kasai et al. | |
| 2006/0235796 A1 | 10/2006 | Johnson et al. | |
| 2007/0011724 A1 | 1/2007 | Gonzalez et al. | |
| 2007/0192841 A1 | 8/2007 | Kim | |
| 2008/0104709 A1 | 5/2008 | Averyt et al. | |
| 2008/0155276 A1 | 6/2008 | Chen et al. | |
| 2008/0216153 A1 | 9/2008 | Aaltonen | |
| 2009/0055642 A1* | 2/2009 | Myers | H04L 63/0869 713/155 |
| 2009/0235346 A1 | 9/2009 | Steinberg | |
| 2009/0287935 A1* | 11/2009 | Aull | H04L 9/3263 713/182 |
| 2009/0288143 A1 | 11/2009 | Stebila et al. | |
| 2009/0320107 A1 | 12/2009 | Corella | |
| 2009/0328169 A1 | 12/2009 | Hutchinson | |
| 2010/0005287 A1 | 1/2010 | Rollins | |
| 2010/0017616 A1 | 1/2010 | Nichols et al. | |
| 2010/0083358 A1 | 4/2010 | Govindarajan et al. | |
| 2010/0100945 A1 | 4/2010 | Ozzie et al. | |
| 2010/0172504 A1 | 7/2010 | Allen | |
| 2010/0174911 A1 | 7/2010 | Isshiki | |
| 2010/0228987 A1 | 9/2010 | Dinov | |
| 2010/0275036 A1* | 10/2010 | Harada | G06F 21/10 713/189 |
| 2011/0009092 A1 | 1/2011 | Etchegoyen | |
| 2011/0252243 A1 | 10/2011 | Brouwer | |
| 2012/0072979 A1 | 3/2012 | Cha et al. | |
| 2012/0117455 A1 | 5/2012 | Fogel et al. | |
| 2012/0131656 A1 | 5/2012 | Slaton et al. | |
| 2012/0158584 A1 | 6/2012 | von Behren | |
| 2012/0158654 A1 | 6/2012 | von Behren | |
| 2012/0166333 A1 | 6/2012 | von Behren | |
| 2012/0192253 A1 | 7/2012 | Betsch et al. | |
| 2012/0209735 A1 | 8/2012 | Subramanian | |
| 2012/0215648 A1 | 8/2012 | Rose | |
| 2012/0323717 A1 | 12/2012 | Kirsch | |
| 2013/0086655 A1 | 4/2013 | Karp | |
| 2013/0111217 A1 | 5/2013 | Kopasz et al. | |
| 2013/0144786 A1 | 6/2013 | Tong | |
| 2013/0145447 A1 | 6/2013 | Maron | |
| 2013/0227047 A1 | 8/2013 | Dolce | |
| 2013/0254856 A1 | 9/2013 | Krishan | |
| 2013/0318581 A1 | 11/2013 | Counterman | |
| 2014/0213344 A1 | 7/2014 | Rose | |
| 2014/0214653 A1 | 7/2014 | Rose | |
| 2014/0222594 A1 | 8/2014 | Rose | |
| 2014/0330708 A1 | 11/2014 | Felse | |
| 2014/0330714 A1 | 11/2014 | Felse | |
| 2014/0330715 A1 | 11/2014 | Felse | |
| 2014/0330716 A1 | 11/2014 | Frew | |
| 2014/0330717 A1 | 11/2014 | Felse | |
| 2014/0330718 A1 | 11/2014 | Felse | |
| 2014/0337937 A1 | 11/2014 | Truskovsky | |
| 2015/0046339 A1 | 2/2015 | Wong | |
| 2015/0058206 A1 | 2/2015 | Blackhurst | |
| 2015/0073986 A1 | 3/2015 | Kligman | |
| 2015/0127930 A1* | 5/2015 | Offenberg | G06F 21/572 713/2 |
| 2015/0154588 A1 | 6/2015 | Purves | |
| 2015/0186864 A1 | 7/2015 | Jones | |
| 2015/0213565 A1 | 7/2015 | Garrett | |
| 2015/0271167 A1 | 9/2015 | Kalai | |
| 2015/0326402 A1* | 11/2015 | Sibert | H04L 9/3271 713/155 |
| 2015/0350826 A1 | 12/2015 | Stone | |
| 2016/0012465 A1 | 1/2016 | Sharp | |
| 2016/0094531 A1* | 3/2016 | Unnikrishnan | G06F 21/30 726/7 |
| 2016/0148201 A1 | 5/2016 | Kadaster | |
| 2016/0328692 A1 | 11/2016 | Camps | |
| 2016/0364713 A1 | 12/2016 | Kingsborough | |
| 2016/0379213 A1 | 12/2016 | Isaacson | |
| 2017/0024743 A1 | 1/2017 | Fogel | |
| 2017/0249632 A1 | 8/2017 | von Behren | |
| 2017/0372305 A1 | 12/2017 | Li | |
| 2018/0056179 A1 | 3/2018 | Rose | |

OTHER PUBLICATIONS

Dashlane Security Whitepaper, Nov. 2011, https://www.dashlane.com/download/Security-Whitepaper-Final-Nov-2011.pdf., 9 pages.

Encryption—How does LastPass store my passwords on their website?, Stack Exchange, (http://webapps.stackexchange.com/questions/11361/how-does-lastpass-store-my-passwords-on-their-website), Jan. 16, 2011, 2 pages.

* cited by examiner

METHODS AND SYSTEMS FOR USER AUTHENTICATION

RELATED APPLICATION

This application claims benefit of U.S. Provisional Patent Application No. 62/437,991 titled "PASSWORDLESS AUTHENTICATION," filed on Dec. 22, 2016, the entirety of which is hereby incorporated by reference.

BACKGROUND

The most common way to authenticate a user for access to a digital service is to use a login and a password that the user has to enter every time he opens a session. The user authentication involves a user entering the user's login and password on a user device, which is then transmitted over a communication network to a server. The server then authenticates the user by matching the received login and password with a version previously stored on the server. This mechanism is widely used because it is easy and inexpensive to implement. However, traditional password-based authentication suffers from several downsides. For example, password based authentication is prone to brute force attacks where an attacker can guess passwords using recursive algorithms. Also, password-based authentication is prone to man-in-the-middle attacks, where an attacker intercepts the password when it is being sent from a user device to a server.

Recently, some big-audience websites have been hacked and databases have been compromised. Among the compromised data, user passwords or password hashes were stolen that can potentially be used to access user accounts on other websites. For example, one password reused on multiple website can be compromised by the weakest website, annihilating other websites' security efforts. User privacy is highly dependent on the security measures each website is putting in place.

BRIEF DESCRIPTION OF THE DRAWINGS

Non-limiting and non-exhaustive examples are described with reference to the following figures. As a note, the same number represents the same element or same type of element in all drawings.

DETAILED DESCRIPTION

Various embodiments are described more fully below with reference to the accompanying drawings, which form a part hereof, and which show specific exemplary embodiments. However, embodiments may be implemented in many different forms and should not be construed as limited to the embodiments set forth herein; rather, these embodiments are provided so that this disclosure will be thorough and complete, and will fully convey the scope of the embodiments to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

Examples of the disclosure provide methods and systems to improve user convenience and security during authentication by removing a need for a password to access a digital service while maintaining a high level of security. The disclosed authentication mechanism (also referred to as a passwordless authentication) may include an automatic authentication application. The automatic authentication application may be provided on a user device. For example, the automatic authentication application may be installed on a user device as an independent application for automatic user authentication. The automatic authentication application allows a user to take advantage of a public-key cryptography mechanism to authenticate the user to an online service through a challenge and a challenge response. In some examples, a second application is installed on a server associated with the online service to support the exchange of challenge and challenge response between the user device and an authentication server.

In some examples, the second application handles storage of keys received from the first application on the user device. When accessing the online services, the first application communicates the challenge response to the website to confirm the user's identity and automatically log the user in. The website verifies the received challenge response and logs the user in upon the verification. In examples, this allows online services, such as websites, to not store passwords anymore. So even if a website gets hacked, the leaked data is not valuable. Second, signing up and signing in become seamless for the user.

The automatic user authentication is a passwordless and seamless way to sign-up and sign-in on a website (also referred to as webpage) using the public-key cryptography. The automatic user authentication described herein is also a more secure solution than traditional password-based authentication because the website does not have to store any sensitive authentication data (e.g., passwords or password hashes) that could be compromised. In some examples, passwordless authentication provides a better user experience than password-based authentication.

Figure 1:
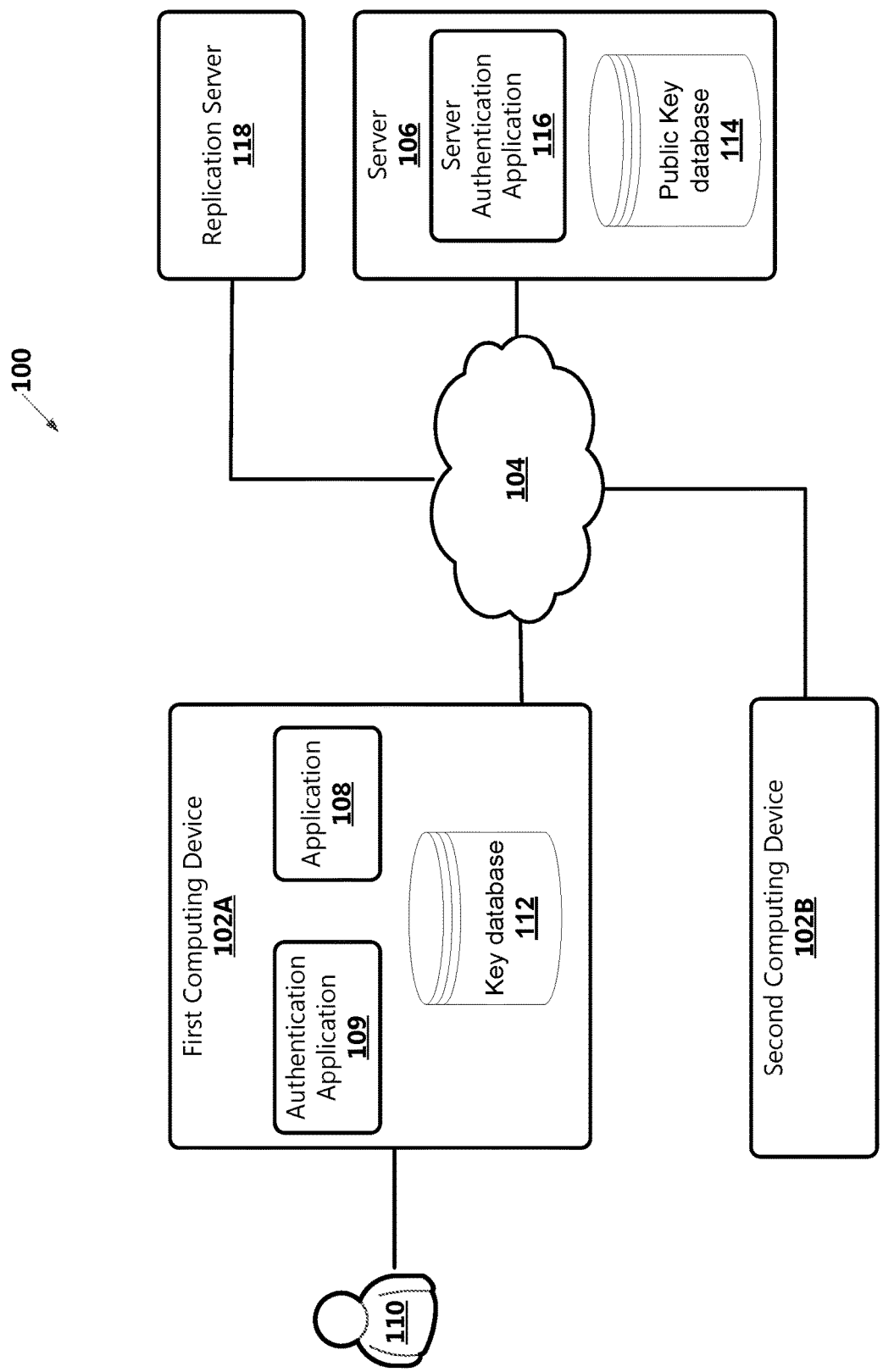
FIG. 1 illustrates an exemplary environment in which methods and systems for user authentication as described herein may be implemented.

Referring now to the drawings, in which like numerals represent like elements, various embodiments will be described. FIG. 1 illustrates an example environment 100 in which methods and systems for automatic user authentication may be implemented. As shown in FIG. 1, example operating environment includes a first computing device 102A and a second computing device 102B (collectively referred to as computing device 102 unless otherwise noted) associated with a user 110. Computing device 102 may be one of various types of computing devices (e.g., a tablet computing device, a desktop computer, a mobile communication device, a laptop computer, a laptop/tablet hybrid computing device, a large screen multi-touch display, a gaming device, a smart television, a wearable device, or other type of computing device) for executing applications 108. User 110 may utilize application 108 on computing device 102 for a variety of tasks, such as accessing emails, banking services, audio/video content, utility bills, etc. An example of application 108 may include a web browser application or an application provided by an online service provider.

In some examples, application 108 is operative to provide a front end of a website for an online service. For example, when user 110 accesses application 108 for requesting a webpage for an online service, application 108 may provide the frontend of the requested webpage. Application 108 may load the webpage including any log-in forms on computing device 102. In one example, application 108 is operative to capture data entered or provided by user 110 and send it to server 106. In some examples, application 108 may encrypt all data before sending it to server 106.

Application 108 may comprise a thick client application, which is stored locally on the computing device 102, or may include thin client application (e.g., web applications) that reside on a remote server and is accessible over a network. A thin client application 108 may be hosted in a browser-controlled environment or coded in a browser-supported language and reliant on a common web browser to render the application 108 executable on the computing device 102.

In some examples, computing device 102 is operative to communicate with server 106 over a network 104. Network 104 may be any type of network capable of facilitating communications between computing device 102 and server 106. Examples of such networks include, but are not limited to, LANs, WANs, cellular networks, and/or the Internet. Computing device 102 may communicate with server 106 via network 104.

Server 106 may be a web server operative to host one or more webpages associated with one or more services. In some examples, server 106 includes one or more computing devices, such as the computing environment illustrated in FIG. 5. In examples, server 106 is a distributed server or a cloud server. Server 106 may also be a web server operative to host a backend of a webpage. For example, server 106 may be operative to provide a webpage for an online service and store information associated with user 110 who is registered with the webpage or the associated online service. In one embodiment, server 106 may be a Web server. In some examples, in addition to hosting the web pages, server 106 is operative to host a public key database 114 and a server authentication application 116.

Computing device 102 further includes an authentication application 109 (also referred to as automatic authentication application). Authentication application 109 is operative to implement passwordless automatic authentication to one or more webpages associated with user 110. In some examples, authentication application 109 is provided as an extension to application 108. For example, authentication application 109 may be provided as an extension to a web browser application. In other examples, authentication application 109 is provided as a stand-alone application. In some examples, authentication application 109 is a thin client application or a thick client application.

As discussed previously, authentication application 109 is operative to automatically authenticate user 110 with one or more online services. For example, authentication application 109 may automatically authenticate user 110 to a net banking account associated with a bank. Authentication application 109 is operative to authenticate user 110 automatically by using a public/private key pair.

For example, authentication application 109 is operative to generate one or more public/private key pairs. The public/private key pair is generated on a per-user, per-service basis. For example, authentication application 109 is operative to generate a first plurality of public/private key pairs for a first user for a first plurality of online services with which the first user is associated. Similarly, authentication application 109 is operative to generate a second plurality of public/private key pairs for a second user for a second plurality of online services with which the second user is associated. In some examples, a public/private key pair is generated every time user 110 accesses a new online service. In other examples, a public/private key pair is generated when a new user accesses an online service. In other examples, user 110 can create multiple accounts with one online service. In that scenario multiple public/private keys could be associated with one user for one online service.

The generated public/private key pair is stored in an encrypted database on computing device 102. For example, authentication application 109 is operative to create a key database 112 on computing device 102. The public/private key pair is stored in the created key database 112. In some examples, only private key of the public/private key pair is stored in key database 112. In other examples, other identifying information, such as a user identifier and a service identifier, is stored along with the respective private key in key database 112.

In some examples, authentication application 109 encrypts key database 112 using an encryption key generated from a master password. Hence, key database 112 is stored on computing device 102 in encrypted form. In some examples, a clear key database is generated in response to authentication application 109 receiving the master password. For example, authentication application 109, in response to user logging in using master password, is operative to generate a decryption key from the master password. Authentication application 109 then is operative to decrypt the encrypted key database 112 with the decryption key generated from the master password to create a clear key database 112. The clear key database 112 is temporary in nature. That is, the clear key database 112 is deleted after a predetermined time or a predetermined event. For example, the clear key database 112 is deleted when user 110 logs out of authentication application 109 or computing device 102. In some examples, clear key database 112 includes selected private keys. For example, clear key database includes one or more private keys associated with user 110 and encrypted with the master password used to log in to authentication application 109.

In some examples, user 110, to access authentication application 109, is prompted to create a master password. For example, authentication application 109 may generate and cause to be displayed on a user interface of computing device 102 a prompt for user 110 to create the user's master password. The master password is required to access authentication application 109 and to automatically login into all online services for which user 110 is registered. In some examples, the master password is used by user 110 to automatically login into all online services for which user 110 is registered to from any device that has authentication application 109. The master password is not sent to server 106, so hacking of information at server 106 does not compromise the master password.

In some examples, authentication application 109 is operative to create separate key databases for storing public/private key pairs associated with each user 110. That is, authentication application 109 is operative to create a dedicated key database 112 for each user 110, even if there are multiple users of the same computing device 102. In some examples, authentication application 109 is operative to store the public/private key pairs associated with multiple users in a single key database 112. For example, authentication application 109 is operative to store the public/private key pairs associated with multiple users in multiple compartments of a single key database 112. In some examples, a size of key database 112 is minimal. That is, key database 112 is operative to store minimal information to keep its size minimal. For example, key database 112 may be operative to store merely private keys of the public private pair keys pairs and a user identifier corresponding to user 110. In other examples, key database 112 is operative to store online service identifier along with the private keys and the user identifier.

In some examples, a server part of authentication application 109 is installed at server 106. A server authentication application 116 is installed on the webpage backend hosted by server 106. In other examples, server authentication application 116 is provided as a stand-alone application operative to interact with the webpage backend hosted by server 106. In some examples, server authentication application 116 may be located on another server accessible to server 106. In other examples, server authentication application 116 may be located on a distributed computing system or a cloud computing system associated with server 106.

In some examples, server authentication application 116 is operative to communicate with authentication application 109 installed on computing device 102. Server authentication application 116 is operative to coordinate with authentication application 109 to provide seamless signing-in and signing-up operation for the online service associated with the webpage hosted by server 106. For example, server authentication application 116 is operative to receive a corresponding public key to encrypt information that can be decrypted with a private key of the public/private key pair.

In some examples, server authentication application 116 is operative to create and manage public key database 114. Public key database 114 is created at server 106 or at a storage device accessible to server 106. For example, a dedicated public key database 114 is created at server 106 to store public keys associated to the public/private key pairs for users registered with the online service. In examples, public key database 114 is operative to, in addition to the public keys of the public/private key pairs, store a user identifier corresponding to each public key. In some examples, public key database 114 may be located on another server accessible to server 106. In other examples, public key database 114 is located on a distributed computing system or an accessible cloud computing system. In addition, more than one computing device 102A and 102B may be associated with the user 110 and run instances of authentication application 109. Key database 112 may be synchronized to all computing devices 102 that are associated with user 110 in the manner described hereinafter to allow user 110 to seamlessly access web services associated with server 106 from different devices.

In some examples, operating environment 100 includes a replication server 118. Replication server 118 is operative to provide seamless login services to user 110 from multiple computing devices, such as first computing device 102A and second computing device 102B. In some examples, replication server 118 includes one or more computing devices, such as the computing environment illustrated in FIG. 5. In other examples, replicating server 118 is a distributed server or a cloud server. In some examples, server 106 and replication server 118 are the same server and in other examples, they may be separate and/or located in distributed system.

Figure 2:
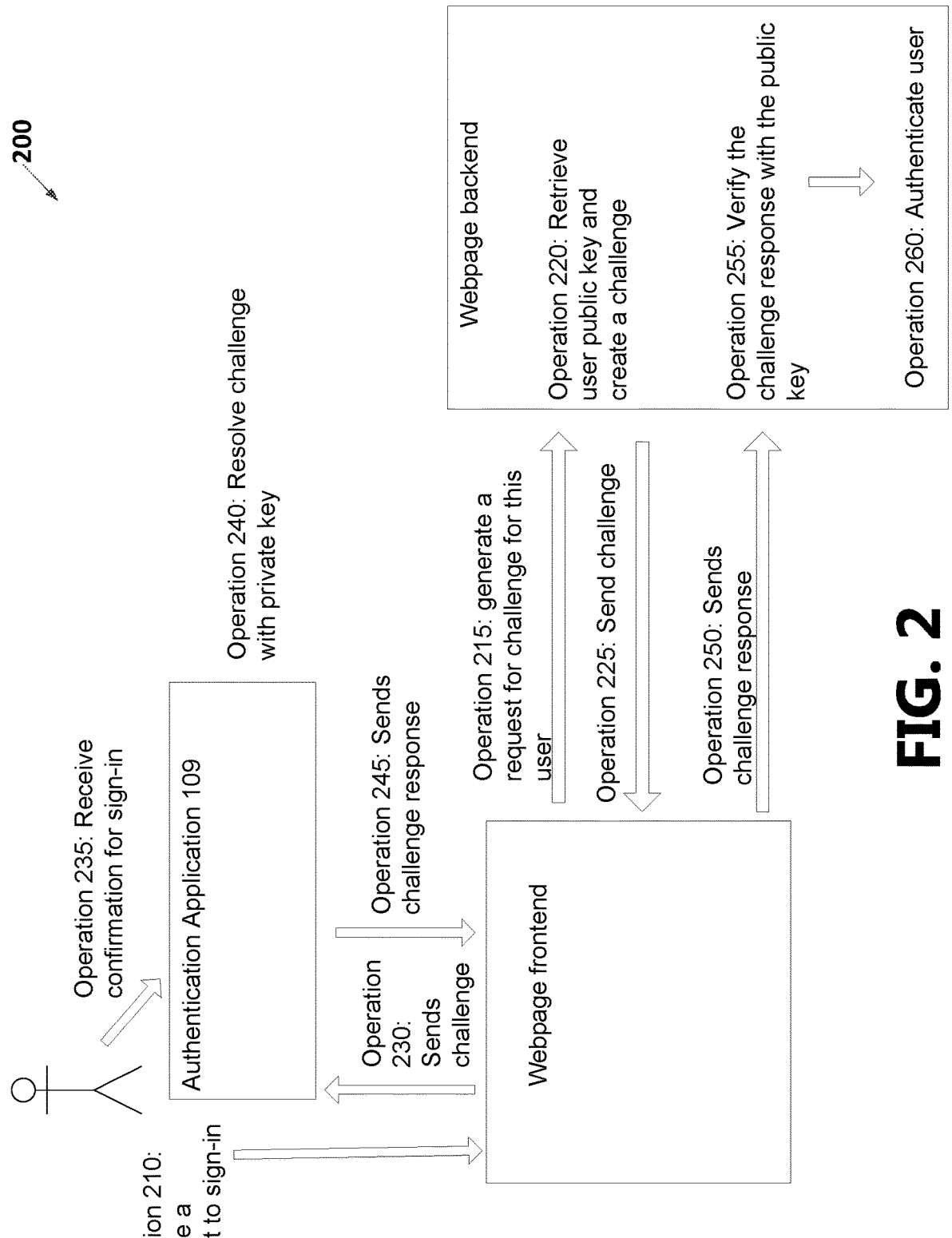
FIG. 2 illustrates an exemplary flow diagram illustrating steps of a method for signing-into an online service as described herein.
Figure 5:
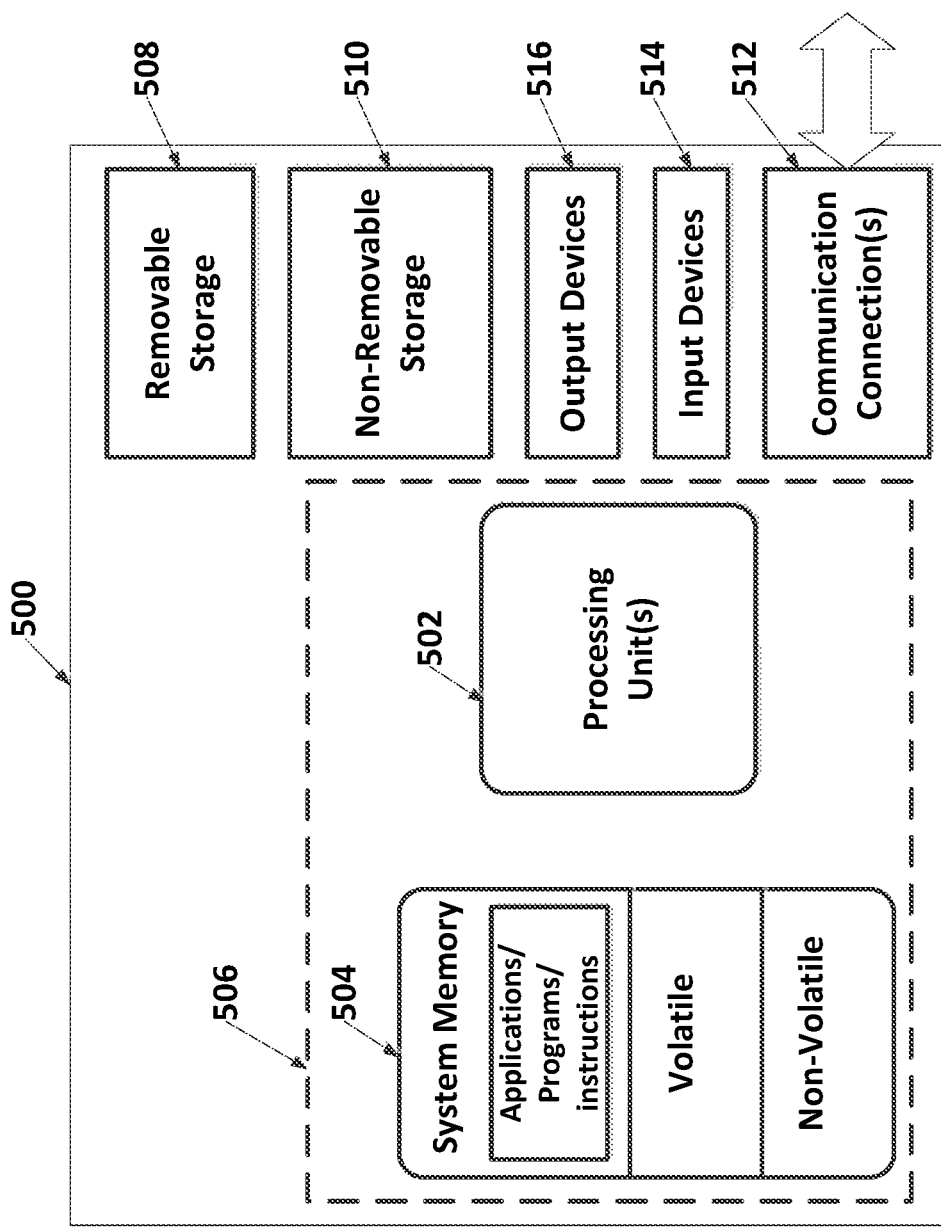
FIG. 5 illustrates one example of a suitable operating environment in which one or more of the present examples may be implemented.

FIG. 2 illustrates an exemplary flow diagram illustrating steps of a method 200 for signing-in to an online service. The explanation of method 200 assumes that the user 110 has already registered for the online service, for example, using method 300 described hereinafter. In examples, method 200 may be executed by exemplary systems such as shown in FIGS. 1 and 5. In some examples, method 200 may be executed on a device having at least one processor configured to store and execute operations, programs or instructions. However, method 200 is not limited to such examples. In at least one example, method 200 may be executed (e.g., computer-implemented operations) by one or more components of a distributed network, for instance, a web service or distributed network service (e.g. cloud service). In examples, operations performed in method 200 may correspond to operations executed by a system and/or service that execute computer programs, application programming interfaces (APIs), or machine-learning processing, among other examples.

Method 200 starts at operation 210 when a request for sign-in is received. For example, a request to sign-in is received when user 110 accesses a webpage of a service provider with which the user is registered. In some examples, the sign-in request is received when user 110 opens application 108 associated with the online service or enters a web address through a user interface associated with an online service registered with the application 109. In some examples, the sign-in request is received in response to user 110 clicking on a user interface element associated with application 108.

In examples, authentication application 109 is activated in response to receiving the sign-in request. In examples, authentication application 109 is activated automatically in response to user 110 signing into a computing device hosting authentication application 109, even if no request is made to access a particular online service. In other examples, authentication application 109 is activated automatically in response to user 110 activating application 108. In some examples, authentication application 109 is activated automatically in response to user 110 accessing a webpage of a service provider. In other examples, authentication application 109 is activated manually by user 110. After activation, authentication application 109 may prompt user 110 to enter a master password through a user interface. In examples, this is required only once per session (e.g., once per browsing session) even if the user 110 browses multiple online services that employ the present systems and methods for authentication. After receiving the master password through the user interface, authentication application 109 may decrypt the encrypted key database 112 associated with user 110 to create a clear key database 112. The clear key database 112 includes one or more private keys associated with the online service(s).

After receiving the sign-in request at operation 210, method 200 proceeds to operation 215 where a request to generate a challenge is originated. For example, after receiving the sign-in request, application 108 may generate the request for challenge. In some examples, the challenge request may be generated by a frontend of a webpage associated with the online services running on application 108. In other examples, the challenge request may be generated by authentication application 109. The generated challenge request is sent to, and received by, a backend of the webpage. For example, in the exemplary architecture of FIG. 1, the generated challenge is sent to server 106 hosting the backend of the webpage. In that example, the generated challenge request is sent to the webpage backend by computing device 102 over network 104. In some examples, the generated challenge request is sent to the webpage backend by application 108 or authentication application 109. The challenge request is received by the webpage backend. In some examples, the challenge request is received by server authentication application 116.

After receiving the challenge request at operation 215, method 200 proceeds to operation 220 where a challenge is created. For example, website backend may include a module for generating challenges. The module may include an automated program for generating the challenge for user 110. The challenge is one that can be solved by a device that has access to the private key for the user for the applicable web service. For example, the generated challenge includes random bytes that may not include any identification data. This challenge data may be signed with a private key by authentication application 109, so server authentication application 116 can check the signature with the public key.

After creating challenge at operation 220, method 200 proceeds to operation 225 where the created challenge is sent to webpage frontend. In the exemplary environment of FIG. 1, the webpage backend is operative to send the encrypted challenge to the webpage frontend operating on computing device 102 over network 104. In some examples, server authentication application 116 is operative to send the encrypted challenge. In examples, the webpage frontend or application 108 is operative to receive the challenge from webpage backend.

After sending the challenge at operation 225, method 200 proceeds to operation 230 where the challenge is sent to authentication application 109. For example, the webpage frontend is operative to forward the challenge it received from the webpage backend to authentication application 109. In some examples, the webpage backend or server authentication application 116 is operative to send the challenge directly to authentication application 109.

After sending the challenge at operation 230, method 200 proceeds to operation 235 where a confirmation for the sign-in request is received. For example, after receiving the challenge, authentication application 109 may prompt user 110 to confirm the sign-in request. In some examples, user 110 is prompted to confirm the sign-in request through a user interface. For example, authentication application 109 is operative to prompt user 110 to provide a confirmation for the sign-in request with the web service. The prompt may be a simple confirmation from the user 110 to confirm the sign-in request or another challenge requiring a particular response. User 110 may provide the confirmation through the same user interface. Authentication application 109 is operative to receive the confirmation from user 110.

After receiving the confirmation for the sign-in request at operation 235, method 200 proceeds to operation 240 where the challenge is resolved. For example, authentication application 109, after receiving the confirmation for the sign-in request, is operative to determine a private key associated with user 110 and the online service. In examples, if the key database 112 has not already been decrypted, the authentication application 109 may cause a prompt to be displayed on computing device 102 for the user to enter the user's master password so that the key database 112 may be decrypted and the private key for the associated webpage be accessed. Authentication application 109 is operative to access the private key from key database 112. Authentication application 109 is then operative to resolve the challenge using the private key. For example, authentication application 109 is operative to solve the challenge programmatically without further input from the user 110. For example, the challenge is solved by signing the challenge data with the private key of the public/private pair. Authentication application 109 can sign the challenge using one or more algorithms such as an elliptic curve digital signature algorithm.

In other examples, the challenge is not sent to authentication application 109, and instead is processed by application 108. For example, application 108, after receiving the challenge may request the private key from authentication application 109 to solve the challenge. Application 108 then is operative to solve the challenge using the private key received from authentication application 109. The decrypted challenge may then presented to user 110 by application 108 or may be programmatically addressed by application 108.

After resolving the challenge response at operation 240, method 200 proceeds to operation 245 where the challenge response is sent to the webpage frontend. For example, authentication application 109 is configured to send the challenge response to the webpage frontend. After sending the challenge response to webpage frontend at operation 245, method 200 proceeds to operation 250 where the challenge response is received by the webpage front end and sent to the webpage backend. For example, webpage frontend is operative to receive the challenge response from authentication application 109 (or application 108) and send the received challenge response to the webpage backend. In some examples, the webpage frontend is operative to send the challenge response to the webpage backend over network 104. In some examples, authentication application 109 is operative to send the challenge response directly to the webpage backend. In examples, the challenge response is sent to server authentication application 116.

After sending the challenge response to webpage backend at operation 250, method 200 proceeds to operation 255 where the challenge response is verified. For example, the webpage backend is operative to receive the challenge response from the webpage backend. The webpage backend then is operative to retrieve the public key of the public/private key pair for the user and the associated web service from public key database 114. The webpage backend is then operative to verify the challenge response. In some examples, the webpage backend is operative to verify the challenge response using a combination of challenge response, the public key, and the challenge. For example, server authentication application 116 may use the public key to verify the signature in the challenge response. Server authentication application 116 can verify the signature using the one or more algorithms used to sign the challenge response.

In some examples, the webpage backend is operative to send the challenge response to the module for generating the challenge, which may use the public key to verify the challenge response. The module is operative to determine whether the received challenge response matches to an expected response to the challenge. For example, the module may verify the signature in the challenge response using the public key. The challenge response can be verified using the one or more algorithms such as elliptic curve digital signature algorithm and the public key. If the received challenge response matches, the module may send a positive verification to the webpage backend. If the received response is not accurate, the module may send a negative verification to the webpage backend.

After verifying the challenge response at operation 255, method 200 proceeds to operation 260 where user 110 is authenticated. For example, in response to receiving a positive verification of the challenge response, the webpage backend may positively authenticate user 110 and allow user 110 (through, e.g., device 102) to access the requested online services. However, if a negative confirmation is received in response to the challenge response from the automated program generating the challenge, the webpage backend denies authenticating user 110 to access the requested online service. In case of denial, user may have to initiate a new request to sign-in, and repeat steps of method 200. Method 200 ends after authenticating or denying user 110.

Figure 3:
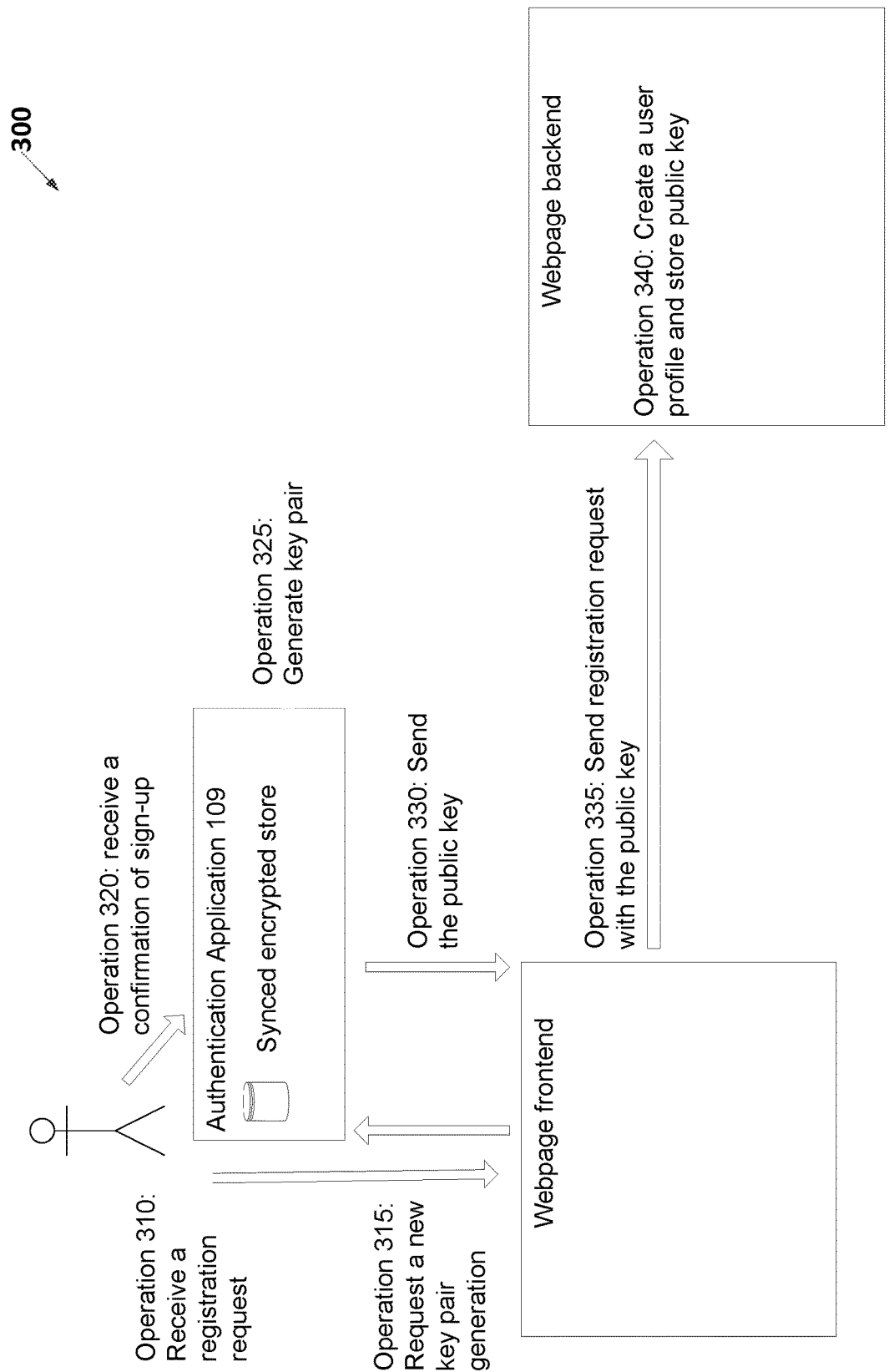
FIG. 3 illustrates an exemplary flow diagram illustrating steps of a method for signing-up with an online service as described herein.

FIG. 3 illustrates an exemplary flow diagram illustrating steps of a method 300 for registering or signing-up for an online service using the present systems and methods. For example, in the exemplary system 100, method 300 may be used for user 110 to sign-up for an online service hosted by server 106. In some examples, method 300 may be executed on a device having at least one processor configured to store and execute operations, programs or instructions. However, method 300 is not limited to such examples. In at least one example, method 300 may be executed (e.g., computer-implemented operations) by one or more components of a distributed network, for instance, a web service or distributed network service (e.g. cloud service). In examples, operations performed in method 300 may correspond to operations executed by a system and/or service that execute computer programs, application programming interfaces (APIs), or machine-learning processing, among other examples.

Method 300 starts at operation 310 when a request to sign-up is received. For example, user 110 may seek to register or sign-up with an online service. To initiate the sign-up, user 110 identifies a service provider to sign-up with. After identifying the service provider, user 110 may load a webpage associated with the online service and initiate a request to sign-up with the identified online service. For example, the sign-up request is received when user 110 opens application 108 associated with the identified service or enters an address associated with the webpage of the online service in application 108. In some examples, the sign-up request is received in response to user 110 clicking on a user interface element associated with application 108 or with the online service.

In some examples, authentication application 109 is activated in response to receiving the sign-up request. In examples, after activation, authentication application 109 is operative to prompt user 110 to enter a master password. After receiving the master password from user 110, authentication application 109 may decrypt the encrypted key database 112 associated with user 110 to create a clear key database. The clear key database includes the existing public/private key pairs associated with user 110. In examples, the clear key database is a temporary database and is deleted after completion of the sign-up process.

After receiving the sign-up request at operation 310, method 300 proceeds to operation 315, where a request to generate a new public/private key pair is initiated. For example, after receiving the sign-up request, application 108 may generate the request for a new public/private key pair for the sign-up. In some examples, the request to generate the new public/private key pair is sent to the webpage frontend. The webpage front end may then send the request to generate the new public/private key pair to authentication application 109. In other examples, authentication application 109 is operative to receive the request to generate the new public/private key pair from the webpage frontend or application 108.

After generating the request for new public/private key pair at operation 315, method 300 may proceed to operation 320 where a confirmation of sign-up is received. For example, authentication application 109, after receiving the request for the new public/private key pair, is operative to verify with user 110 that user 110 has requested to register with the identified online service. In examples, this is accomplished by displaying a prompt through a user interface. Authentication application 109 is operative to send a confirmation request including causing the display of a confirmation form for user 110. User 110 can confirm the registration request to authentication application 109. For example, user 110 can confirm the registration request by clicking on a confirm button in the confirmation form presented as a user interface element to user 110. In some examples, method 300 may skip the confirmation step. For example, after generating the request for new public/private key pair at operation 315, method 300 may proceed to operation 325 to generate the new public/private key pair for the sign-up request.

After receiving the conformation for the sign-up at operation 320, method 300 proceeds to operation 325 where the new public/private key pair is generated for the combination of user 110 and the identified online service. The new public/private key pair is generated by authentication application 109. For example, authentication application 109 is operative to generate the new public/private key pair using a key pair generation mechanism. In some examples, authentication application 109 is operative to generate the public/private key pair by requesting and receiving the new public/private key pair from a key pair generator external to authentication application 109. In some examples, authentication application 109 is operative to generate a new public/private key pair for each unique combination of users and online services. In some examples, user 110 may have multiple profiles or accounts with a single online service. In that scenario, a user/service pair may be associated with more than one public/private key pair. For example, a separate public/private key pair may be generated for each unique combination of user profile/account and online service.

In one example, the public/private key pair is an asymmetric key pair that includes a public key that may be disseminated widely and a private key that is known only to authentication application 109. In examples, the present use of the public/private key pair permits a safe challenge/challenge-response exchange, whereby only the holder of the paired private key can successfully complete a challenge created by a service holding the public key. In some embodiments, the public/private key pair is asymmetric with each key having a length between 32-200 digits, although other implementations are possible. Authentication application 109 is operable to store the new public/private key pair in key database 112.

In some examples, authentication application 109 is operable to store only the private key of the newly generated public/private key pair in key database 112. In some examples, authentication application 109 is operative to store a user identifier along with the private key. The user identifier is used to locate the private key associated with a user. In some examples, authentication application 109 is operative to store an online service identifier along with the private key and the user identifier. The online service identifier is used to locate the private key associated with the online service. In some examples, the online service identifier along with the user identifier is used to locate the private key associated with the unique user/online service combination.

After generating the new public/private key pair at operation 325, method 300 proceeds to operation 330 where the public key associated with the generated new public/private key pair is sent to the webpage frontend. For example, authentication application 109 is operable to send the public key to the website frontend, which may be implemented by application 108 in the example environment 100 of FIG. 1.

After sending the public key to webpage frontend at operation 330, method 300 proceeds to operation 335 where the sign-up request along with the public key is sent to the webpage backend. For example, the website frontend is operable to receive the public key from authentication application 109 and append the sign-up request (also referred to as a registration request) with the received public key. The webpage frontend is then operable to send the sign-up request and the public key to the webpage backend. In some examples, webpage frontend is operable to send the registration request with the public key to the webpage backend over network 104. In some examples, authentication application 109 is operable to append the registration request to the public key and send to the webpage backend. In some examples, application 108 is operable to append the registration request to the public key and send to the webpage backend. In examples, the registration request appended with the public key is sent to server authentication application 116.

After sending the registration request to webpage backend at operation 335, method 300 proceeds to operation 340 where a user profile is created and stored. For example, the webpage backend is operative to receive the registration request and the public key. In some examples, the webpage backend is operative to receive the registration request and the public key from application 108 or authentication application 109. The webpage backend is then operative to create a user profile in public key database 114 corresponding to the received sign-up request. For example, the webpage backend is operative to create an entry in public key database 114 corresponding to the received sign-up request. The webpage backend is then operative to store the public key along with an identifier associated with user 110 and an identifier associated with the identified online service in the entry. The user identifier and the online service identifier are used to identify the public key to authenticate a request from user 110 to log-in to the online service after registration. In some examples, server authentication application 116 is configured to receive and store the public key in public key database 114. After creating the user profile at operation 340, method 300 may terminate. In some examples, a confirmation of successful sign-up may be requested, e.g., by prompting user 110 to confirm the sign-up through a user interface before proceeding.

In some examples, authentication application 109 is operative to send the public key of the newly generated public/private key pair directly to the webpage backend. In addition to sending the public key, authentication application 109 is operative to send the user identifier as well as the online service identifier to the webpage backend. In some examples, authentication application 109 is operative to send the registration form along with the public key and user identifier as well as the online service identifier to the webpage backend. In some examples, authentication application 109 is operative to send the public key of the newly generated public/private key pair directly to server authentication application 116.

Figure 4:
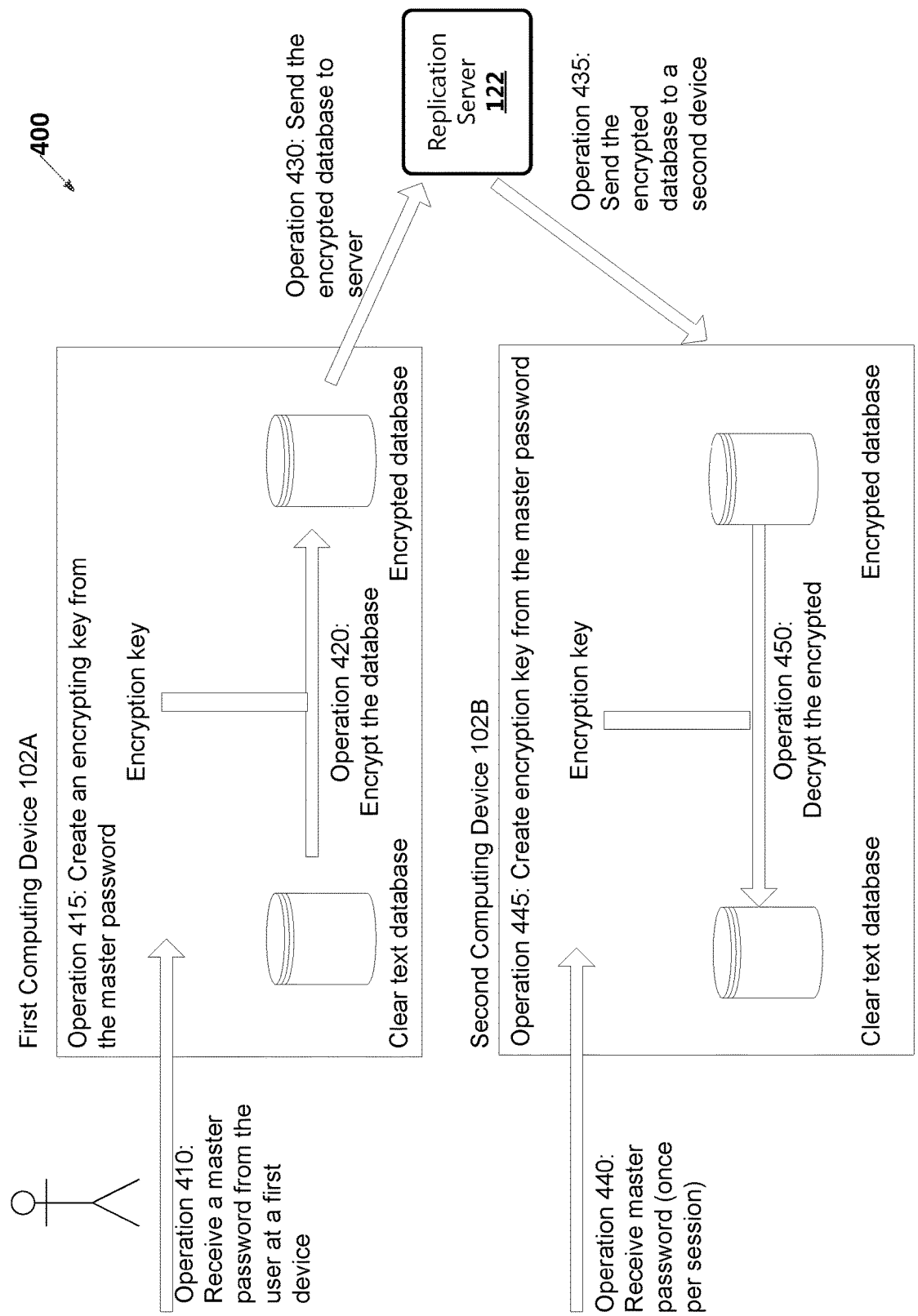
FIG. 4 illustrates an exemplary flow diagram illustrating steps of a method for synchronizing a second device for a user as described herein.

FIG. 4 illustrates an exemplary flow diagram illustrating steps of a method for synchronizing a secondary device for user authentication. For example, method 400 may enable a first user to be authenticated on both a first device (e.g., first computing device 102A) and a second device (e.g., second computing device 102B). As a result, method 400 may allow a seamless authentication of user 110 for online services from any device for those online services for which user 110 is registered. In examples, method 400 may synchronize key database 112 on any device for user 110 to access the user's registered online services. In examples, method 400 may be executed by an exemplary system such as shown in FIGS. 1 and 5. In some examples, method 400 may be executed on a device having at least one processor configured to store and execute operations, programs or instructions. However, method 400 is not limited to such examples. In at least one example, method 400 may be executed (e.g., computer-implemented operations) by one or more components of a distributed network, for instance, a web service or distributed network service (e.g. cloud service). In examples, operations performed in method 400 may correspond to operations executed by a system and/or service that execute computer programs, application programming interfaces (APIs), or machine-learning processing, among other examples.

Method 400 starts at operation 410 where a master password is received. For example, the master password is received from user 110 on a first computing device 102A (also referred to as a primary device). User 110 can enter the master password using an input device, such as a keypad, to enter the master password. The master password is received by authentication application 109. As discussed previously, the master password is a password created by user 110 to access authentication application 109.

After receiving the master password at operation 410, method 400 proceeds to operation 415 where an encryption key is created. For example, authentication application 109 is operative to create the encryption key from the master password. In examples, authentication application 109 is operative to use an automated algorithm to create the encryption key from the master password.

After generating the encryption key at operation 415, method 400 proceeds to operation 420 where key database 112 is encrypted. For example, a clear text database comprising the private keys associated with user 110 is encrypted. The clear text database is encrypted using the encryption key generated from the master password. In some examples, authentication application 109 is operative to encrypt the clear text database. In examples, the clear text database includes the private keys of the public/private key pairs associated with user 110. In some examples, each private key of the public/private key pairs is encrypted individually after being created in accordance, e.g., with the method 200 of FIG. 2, to create the encrypted database.

After encrypting the clear text database at operation 420, method 400 proceeds to operation 430 where the encrypted database is sent to replication server 118. For example, authentication application 109, after encrypting the clear text database, is operative to send the encrypted database to replication server 118. Authentication application 109 is operative to send the encrypted database to replication server 118 is sent over network 104. In some examples, application 108 is operative to send the encrypted database to server 106 over network 104. Replication server 118 is operative to receive the encrypted database.

After sending encrypted database to replication server 118 at operation 430, method 400 proceeds to operation 435 where the encrypted database is sent by replication server 118 to a second computing device 102B. For example, replication server 118 is operative to send the encrypted database it received from first computing device 102A to second computing device 102B from which user 110 is planning to access authentication application 109 or one or more online services she is registered to. Replication server 118 is operative to send the encrypted database to second computing device 102B over network 104.

In some examples, since the encrypted database is encrypted using a key generated from the master password, replication server 118 will not be able to decrypt the encrypted database. After sending encrypted database to the second device at operation 435, method 400 proceeds to operation 440 where the master password is received at second computing device 102B. For example, authentication application 109 running on second computing device 102B may prompt user 110 to enter the master password. User 110 can enter the master password using an input device, such as a keypad, to enter the master password. The master password is received by authentication application 109 at second computing device 102B. As discussed previously, the master password is a password created by user 110 to access authentication application 109.

After receiving the master password at operation 440, method 400 proceeds to operation 445 where an encryption key is created. For example, authentication application 109 at the second device is operative to create the encryption key from the master password. In examples, the encryption key created on second computing device 102B is the same as the encryption key created on first computing device 102A. Authentication application 109 is operative to use an automated algorithm to create the encryption key from the master password.

After creating the encryption key at operation 445, method 400 proceeds to operation 450 where key database 112 is decrypted. For example, the received encrypted database associated with user 110 is decrypted. The encrypted database is decrypted using the encryption key generated from the master password. In some examples, authentication application 109 is operative to decrypt the encrypted database to generate the clear text database. In some examples, the clear text database is temporarily stored on the second device. In some examples, the private keys of the public/private key pairs associated with user 110 can then be accessed by the second device. In this manner, user 110 may be able to use the private keys of the public/private key pairs on the second device, e.g., to implement the method 200 of FIG. 2 on a separate device, including accessing multiple web services with a single master password that is never sent to a server. After creating the clear text database at operation 450, method 400 may terminate.

An example advantage of the methods and systems described herein includes that the website associated with the online service does not need to store passwords. Public keys are by definition public, and are not sensitive data. If the website gets breached, the leaked data is not valuable. This clearly reduces the web service provider's liability and makes them more compliant towards new regulations such as EU GDPR.

An additional advantage of the methods and systems described herein includes that common attacks against password-based authentication are not applicable or are diminished. For example, for a brute force attack, the private keys can be much longer to break than a user password. Hence, successful brute force attacks against long and random data is unrealistic. Similarly, for third party attacks on messages during transmission between computing device 102 and server 106 is safe and public. There is no security risk if an attacker manages to obtain a public key. In addition, the website stores public keys, which are not sensitive data, unlike passwords.

Advantages for the users may include seamless signing-up and signing-in. For example, when the master password has already been entered for a particular session, signing-up and signing-in to an online service requires only two clicks. User 110 does not need to remember a login or password for each web service, as the present system is doing it on the user's behalf Moreover, user 110 does not need to carry an additional physical device solely for secure passwordless authentication, and the private keys may be synced between all user devices.

In addition to aforementioned example advantages, the methods and systems described herein are useful in the context of complex authentication flows, such as 3-step authentication for online banking, and the use of 2-factor authentication mechanism. For example, the methods and systems described herein provide seamless authentication in the background for secured action on the website (wire money on a bank website for instance). Moreover, the methods and systems described herein may be combined with other 2-factor mechanisms as well.

FIG. 5 and the additional discussion in the present specification are intended to provide a brief general description of a suitable computing environment in which the present disclosure and/or portions thereof may be implemented. Although not required, the embodiments described herein may be implemented as computer-executable instructions, such as by program modules, being executed by a computer, such as a client workstation or a server. Generally, program modules include routines, programs, objects, components, data structures and the like that perform particular tasks or implement particular abstract data types. Moreover, it should be appreciated that the invention and/or portions thereof may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

FIG. 5 illustrates one example of a suitable operating environment 500 in which one or more of the present embodiments may be implemented. For example, computing devices such as computing device 102, server 106, etc., may comprise the system 500. This is only one example of a suitable operating environment and is not intended to suggest any limitation as to the scope of use or functionality. Other well-known computing systems, environments, and/or configurations that may be suitable for use include, but are not limited to, personal computers, server computers, hand-held or laptop devices, multiprocessor systems, microprocessor-based systems, programmable consumer electronics such as smart phones, network PCs, minicomputers, mainframe computers, distributed computing environments that include any of the above systems or devices, and the like.

In its most basic configuration, operating environment 500 typically may include at least one processing unit 502 and system memory 504. Depending on the exact configuration and type of computing device, system memory 504 (storing, among other things, venue-based applications module(s), e.g., venue check-in applications, venue search applications, geocoding/reverse geocoding applications, APIs, programs, etc. and/or other components or instructions to implement or perform the system and methods disclosed herein, etc.) may be volatile (such as RAM), non-volatile (such as ROM, flash memory, etc.), or some combination of the two. This most basic configuration is illustrated in FIG. 5 by dashed line 506. Further, environment 500 may also include storage devices (removable, 408, and/or non-removable, 510) including, but not limited to, magnetic or optical disks or tape. Similarly, environment 500 may also have input device(s) 514 such as a keyboard, mouse, pen, voice input, etc. and/or output device(s) 516 such as a display, speakers, printer, etc. Also included in the environment may be one or more communication connections, 512, such as LAN, WAN, point to point, etc.

Operating environment 500 may include at least some form of computer readable media. The computer readable media may be any available media that can be accessed by processing unit 502 or other devices comprising the operating environment. For example, the computer readable media may include computer storage media and communication media. The computer storage media may include volatile and nonvolatile, removable and non-removable media implemented in any method or technology for storage of information such as computer readable instructions, data structures, program modules or other data. The computer storage media may include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information. The computer storage media may not include communication media.

The communication media may embody computer readable instructions, data structures, program modules, or other data in a modulated data signal such as a carrier wave or other transport mechanism and includes any information delivery media. The term "modulated data signal" may mean a signal that has one or more of its characteristics set or changed in such a manner as to encode information in the signal. For example, the communication media may include a wired media such as a wired network or direct-wired connection, and wireless media such as acoustic, RF, infrared and other wireless media. Combinations of the any of the above should also be included within the scope of computer readable media.

The operating environment 500 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets and the Internet.

The different aspects described herein may be employed using software, hardware, or a combination of software and hardware to implement and perform the systems and methods disclosed herein. Although specific devices have been recited throughout the disclosure as performing specific functions, one skilled in the art will appreciate that these devices are provided for illustrative purposes, and other devices may be employed to perform the functionality disclosed herein without departing from the scope of the disclosure.

As stated above, a number of program modules and data files may be stored in the system memory 504, such as authentication application 109. While executing on the processing unit 502, removable storage 508 (e.g., applications, Input/Output (I/O) management, and other utilities) may perform processes including, but not limited to, one or more of the stages of the operational methods described herein such as method 200, method 300, and method 400 illustrated in FIGS. 2, 3, and 4 for example.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality described herein may be operated via application-specific logic integrated with other components of the operating environment 500 on the single integrated circuit (chip). Examples of the present disclosure may also be practiced using other technologies capable of performing logical operations such as, for example, AND, OR, and NOT, including but not limited to mechanical, optical, fluidic, and quantum technologies. In addition, examples of the invention may be practiced within a general purpose computer or in any other circuits or systems.

This disclosure described some aspects of the present technology with reference to the accompanying drawings, in which only some of the possible embodiments were shown. Other aspects may, however, be embodied in many different forms and should not be construed as limited to the embodiments set forth herein. Rather, these aspects were provided so that this disclosure was thorough and complete and fully conveyed the scope of the possible embodiments to those skilled in the art.

Although specific aspects were described herein, the scope of the technology is not limited to those specific embodiments. One skilled in the art will recognize other embodiments or improvements that are within the scope and spirit of the present technology. Therefore, the specific structure, acts, or media are disclosed only as illustrative embodiments. The scope of the technology is defined by the following claims and any equivalents therein.

What is claimed is:

1. A computer-implemented method for accessing a web service, comprising:
   generating, by a computing device, a registration request for a first user to access a web service;
   generating a public/private key pair for the combination of the first user and the web service;
   storing, by the computing device, the private key of the public/private key pair in a database;
   sending, by the computing device, the registration request and the public key of the public/private key pair to the web service;
   sending a first request for the first user to access first content from the web service;
   receiving, in response to the first request, a first challenge;
   resolving, by the computing device, the first challenge using the private key;

sending a first challenge response comprising the resolved first challenge, to the web service;

receiving access to the first content;

generating an encryption key from a master password for the user;

encrypting the database with the encryption key;

receiving, by the computing device, the master password; and decrypting the database.

2. The method of claim 1, wherein the master password is not sent by the computing device to any other device.

3. The method of claim 1, wherein the first challenge response is generated programmatically by signing the first challenge.

4. The method of claim 1, further comprising receiving, by the computing device, the database from a replication server.

5. The method of claim 1, wherein the public/private key pair is unique to a combination of the first user and the first content.

6. The method of claim 1, further comprising creating, in response to the registration request, a user profile comprising the public key and a user identifier.

7. A system comprising:

a memory device; and at least one processor coupled to the memory device, the at least one processor being operative to:

generate a registration request for a first user to access a web service;

generate a public/private key pair for the combination of the first user and the web service;

store the private key of the public/private key pair in a database;

send the registration request and the public key of the public/private key pair to the web service;

send a first request for the first user to access first content from the web service;

receive, in response to the first request, a first challenge;

resolve the first challenge using the private key;

send a challenge response comprising the resolved first challenge, to the web service;

receive access to the first content;

generate an encryption key from a master password for the user;

encrypt the database with the encryption key;

receive, by the computing device, the master password; and decrypt the database.

8. The system of claim 7, wherein the master password is not sent by the system to any other device.

9. The system of claim 7, wherein the challenge response is generated programmatically by signing the first challenge.

10. The system of claim 7, further wherein the database is received from a replication server.

11. The system of claim 7, wherein the public/private key pair is unique to a combination of the first user and the first content.

12. The system of claim 7, wherein the processing device is operative to create, in response to the registration request, a user profile comprising the public key and a user identifier.

13. A method comprising:

generating a first registration request for a first user to access a web service;

generating a first public/private key pair for the combination of the first user and the web service;

storing a first private key of the first public/private key pair in a database;

sending the registration request and a first public key of the first public/private key pair to the web service;

sending a first request for the first user to access first content from the web service;

receiving, in response to the first request, a first challenge;

resolving the first challenge using the first private key;

sending a first challenge response comprising the resolved first challenge, to the web service;

receiving access to the first content;

generating a second registration request for the first user to access a second web service;

generating a second public/private key pair, including a second private key and a second public key, for the combination of the first user and the second web service;

storing the second private key in the database;

sending the second registration request and the second public key to the second web service;

sending a second request for the first user to access second content from the second web service;

receiving, in response to the second request, a second challenge;

resolving the second challenge using the second private key;

sending a second challenge response comprising the resolved second challenge to the second web service; and receiving, by the computing device, access to the second content.

14. The method of claim 13, wherein the master password is not sent to any other device.

15. The method of claim 13, wherein the first challenge response and the second challenge response are generated programmatically by signing the first challenge and the second challenge respectively.

16. The method of claim 13, wherein the first public/private key pair is unique to a combination of the first user and the first content.

17. The method of claim 13, further comprising receiving the database from a replication server.

18. The method of claim 13, further comprising creating, in response to the first registration request, a user profile comprising the first public key and a user identifier.

* * * * *